3,257,448
PREPARATION OF SATURATED ESTERS BY OXI-
DATION OF ALDEHYDES WITH A PALLADIUM
SALT, A REDOX SYSTEM AND MOLECULAR
OXYGEN IN ALCOHOLIC MEDIUM
Duncan Clark and Percy Hayden, Norton-on-Tees, England, assignors to Imperial Chemical Industries Limited, London, England, a corporation of Great Britain
No Drawing. Filed Oct. 28, 1963, Ser. No. 319,564
Claims priority, application Great Britain, Oct. 29, 1962, 40,747/62
10 Claims. (Cl. 260—484)

This invention relates to the production of esters.

According to the present invention, there is provided a process foor converting a saturated aliphatic or an aromatic aldehyde to an ester of the carboxylic acid corresponding to the said aldehyde which comprises contacting the aldehyde with a saturated aliphatic alcohol in the presence of a palladium salt.

Aldehydes suitable for use in the present invention are for example acetaldehyde and propionaldehyde, alkoxy aldehydes such as beta-methoxy propionaldehyde, acyloxy aldehydes such as beta-acetyloxy propionaldehyde, and aromatic aldehydes such as benzaldehyde and paratolualdehyde.

It is not intended to be bound by any statement of theory, but it is believed that the production of esters of carboxylic acids by the process of the present invention occurs through reaction at the aldehyde group (—CHO) of the initial aldehyde, irrespective of the structure of the remainder of the aldehyde molecule.

A wide variety of alcohols are suitable for use in the process of the present invention, satisfactory results being obtained, for example with methanol, ethanol, n-propanol, isopropanol, n-butanol, sec.-butanol and tertiary-butanol, and those alcohols containing up to ten carbon atoms, inclusive.

The process may be carried out at a temperature in the range of 0° to 200° C., preferably in the range 50° to 150° C. The process may be carried out at atmospheric pressure or at an elevated pressure which is at least sufficient to maintain the reactants substantially in the liquid phase. For example, elevated pressures up to 50 atmospheres or more may be used.

The preferred palladium salt for use in the present invention is a halide, other than a fluoride. Palladous chloride is particularly suitable. Other palladium salts, such as palladous acetate, may be used.

If a palladium compound such as palladous chloride is used, in the present process, this is reduced under the reaction conditions to metallic palladium. Disadvantages resulting from this reduction can be overcome according to a feature of the invention, by operating in the presence of an inorganic redox system, notably a copper compound such as cupric chloride or cupric acetate or a ferric compound, notably ferric chloride. In addition, it is desirable to provide, in the reaction mixture, for the presence of an alkali metal salt of a monocarboxylic acid, for example of lithium acetate. The alkali metal salt may be present in a concentration up to two molar, i.e. two moles per litre of reactant liquor. In an improved form of this embodiment of the invention provision is made for the presence of molecular oxygen in the reaction system. If the palladium compound and/ or the redox system is a chloride, this results in chloride ions being present in the reaction system. This is advantageous and in particular the chloride ion concentration should be between 0.05 and 0.5 molar. If this concentration is not provided by the palladium compound and the redox system, an alkali metal chloride, preferably sodium chloride or lithium chloride, should be incorporated in the reaction mixture. The cupric or ferric salt employed facilitates the re-oxidation of the reduced palladium salt. This re-oxidation may be carried out simultaneously with ester formation or as a separate step, if desired in a separate vessel, to give a two-stage method of operation.

In this two-stage method of operation in which ester is produced in the first stage and regeneration is carried out in the second, in the same vesssel, the introduction of aldehyde into the reaction vessel is interrupted, while carrying out the regeneration by passing molecular oxygen through the vessel. For example, if a cupric salt has been present in the reaction vessel and this has been reduced in part at least to a cuprous salt, this may be re-oxidised to a cupric salt by passing molecular oxygen through the vessel. Alternatively, the regeneration may be carried out continuously or at intervals by withdrawing part at least of the reactant liquid and contacting it in a separate vessel with molecular oxygen.

When a redox system is used and this is being regenerated, water is formed. This water may be deleterious to the reaction because it may hydrolyse the desired ester to its corresponding carboxylic acid and alcohol and may favor the direct oxidation of the aldehyde to the corresponding carboxylic acid. In particular, the water content of the reaction system should not exceed 10% by weight of reactant liquor present: preferably it should not exceed 5% by weight. Thus, the removal of water from the reaction system is advantageous if the most satisfactory results are to be obtained. This water removal may be accomplished, for example, by distillation. The disadvantage resulting from the formation of water can also be overcome by intermittent ester formation and regeneration or by two-vessel operation. In these, the water may be removed after the regeneration step and in this event the ester comes into contact with a relatively small amount of water before it is removed from the reaction system.

In the following discussion of particular embodiments of the present invention, it is assumed that in all cases the alcohol is methanol. By the present process, acetaldehyde and benzaldehyde can be converted to methyl acetate and methyl benzoate respectively. Again, it is possible by the present process to convert beta-methoxy or beta-acetyloxy propionaldehyde to methyl beta-methoxypropionate or methyl beta-acetyloxy propionate respectively.

It is a feature of the present invention that acetaldehyde employed may be formed in situ, for example, by oxidation of ethylene by providing for the presence of water, which may be present for example in quantities up to 5% by weight of the reactant liquor.

Alternatively, when it is desired to use a beta-alkoxy propionaldehyde as the starting material, for example beta-methoxy propionaldehyde, this may be produced in situ by adding acrolein to the reaction mixture irrespective of whether it contains a redox system or not.

The esters produced by the process of the present invention have a wide range of uses. In particular, the beta-alkoxy and beta-acyloxy propionates may be decomposed to acrylates which may be used in the production of polymers.

*Example 1.—The oxidation of acetaldehyde in methanolic media*

A catalyst solution of the following composition was prepared:

|  | Grams | Molar |
|---|---|---|
| $PdCl_2$ | 0.89 | $2.5 \times 10^{-2}$ |
| LiCl | 0.85 | $10 \times 10^{-2}$ |
| LiOAc | 26.4 | 2.0 |
| $Cu(OAc)_2$ | 10.9 | 0.3 | in 177 mls. of methanol.

The reaction was carried out in a flask fitted with a gas recirculating system. Gas flow through the apparatus was induced by using a hollow shafted cruciform stirrer to contact gas and liquid, and the amount of oxygen absorbed was found by measuring the decrease in gas volume in a burette connected to the recirculating system. The apparatus was designed to operate at atmospheric pressure.

The catalyst solution was introduced to the flask and heated to 55° C. and the reaction started by the rapid addition of 17.6 gms. (0.4 mole) of acetaldehyde to the solution. Oxygen was passed through the solution at 25 liters/hr. and after 3 hours 0.125 mole had been absorbed.

The reaction was continued for a further 18 hours when a total of 0.21 mole of oxygen had been absorbed.

The product was isolated by extracting the reaction mixture with petroleum ether. The extract was then washed with water, dried over anhydrous magnesium sulphate and fractionated. 4.5 gms. (0.1 mole) of aldehyde were recovered unchanged and 20 gms. (0.27 mole) of methyl acetate obtained. This represents a 67% yield of ester on the weight of aldehyde used.

*Example 2.—The oxidation of acetaldehyde in ethanol*

Acetaldehyde was oxidized as described in Example 1, except that the catalyst solution was made up in 177 mls. of ethanol.

The amount of ester present in the catalyst solution at different times during the progress of the reaction was determined by gas-liquid chromatographic analysis of samples of the reaction medium:

| Time in hours | $O^2$ absorbed in moles | Ethyl acetate present in reaction solution, moles |
|---|---|---|
| 1 | 0.03 | 0.04 |
| 2 | 0.05 | 0.08 |
| 3 | 0.07 | 0.10 |
| 24 | 0.12 | 0.13 |

The product was recovered by the technique described in the previous example. 10 gms. of ethyl acetate were obtained.

*Example 3*

A catalyst solution of the following composition was prepared:

|  | G. | Molar |
|---|---|---|
| $PdCl_2$ | 0.89 | $2.5 \times 10^{-2}$ |
| LiOAc | 26.4 | 2.0 |
| $Cu(OAc)_2$ | 10.9 | 0.3 | in 165 mls. of methanol.

Oxygen was blown through the solution which was maintained at 55° C. and n-butyraldehyde (28.8 g.) added to start the reaction. After 100 minutes the reaction was stopped and the reaction mixture separated into its components as described previously. Methyl n-butyrate (B.P. 102° and 760 mm./Hg) was obtained in 72% yield (15.3 g.) based on the n-butyraldehyde added.

*Example 4*

Benzaldehyde (42.4 g.) was added to a catalyst solution consisting of:

|  | Grams | Molar |
|---|---|---|
| $PdCl_2$ | 0.89 | $2.5 \times 10^{-2}$ |
| LiCl | 0.85 | $10 \times 10^{-2}$ |
| LiOAc | 26.4 | 2.0 |
| $Cu(OAc)_2$ | 10.9 | 0.3 | in 160 mls. of methanol.

The solution was maintained at a temperature of 55° C. and oxygen blown through the mixture at atmospheric pressure for 21 hours. The product was isolated by the method described in Example 1, except that before fractionation excess benzaldehyde was removed as the bisulphite complex. 16 grams of the methyl ester were obtained. No evidence for the formation of free benzoic acid could be found.

*Example 5.—Oxidation of beta-methoxy propionaldehyde in methanol*

The following catalyst solution was prepared and used to oxidize beta-methoxypropionaldehyde (2.6 g.).

|  | G. |
|---|---|
| $PdCl_2$ | 0.34 |
| LiOAc | 0.56 |
| $Cu(OAc)_2$ | 4.36 | in 80 mls. of methanol.

Oxygen was blown through the solution at 25 liters/hr. for 20 hours, the reaction temperature being held at 55° C.

50% of the aldehyde was converted into beta-methoxymethyl propionate and the remainder recovered unchanged.

*Example 6*

200 mls. of a solution of identical composition to that described in Example 5 were used to oxidize 4.2 g. of acrolein as a precursor of beta-methoxypropionaldehyde. The experimental techniques employed were the same as those described in the first example.

After six hours the reaction was stopped and 80% of the original aldehyde added recovered in the form of $3 \times 10^{-2}$ moles (2.6 g.) of beta-methoxypropionaldehyde and $3 \times 10^{-2}$ moles (3.5 g.) of beta-methoxy methyl propionate.

The progress of the reaction was followed by gas liquid chromatography analysis of the reaction medium every 30 minutes. The acrolein had disappeared after 1 hour and the only product detected at this time was the beta-methoxy propionaldehyde. From this period onwards the presence of the ester was detected in increasing amounts.

*Example 7*

Beta-methoxy-iso-butyraldehyde (3. g.) was added to a catalyst solution consisting of:

|  | G. |
|---|---|
| $PdCl_2$ | 0.89 |
| LiCl | 0.85 |
| LiOAc | 26.4 |
| $Cu(OAc)_2$ | 10.9 | in 197 mls. of methanol contained in a stirred reaction vessel through which oxygen was passed at 20 liters/hr. The temperature of the solution was maintained at 55° C. throughout. After 20 hours, 1.5 liters of oxygen had been absorbed and the reaction was terminated. Beta-methoxymethyl-iso-butyrate (1.3 g.) was isolated from the reaction mixture by extraction and distillation along with unchanged aldehyde. This represents a 50% yield of ester on the aldehyde converted.

*Example 8.—Oxidation of acetaldehyde in methanol in the absence of molecular oxygen*

Palladous chloride (17.7 g.), acetaldehyde (39 g.) and methanol (40 g.) were refluxed together for 72 hours. Metallic palladium was precipitated during the course of the reaction. At the end of the reaction, palladium (2 g.) was filtered off and the filtrate distilled to give methyl acetate (1.18 g.) and dimethyl acetal (1.89 g.). Water was also formed in the reaction.

*Example 9.—Oxidation of acetaldehyde in ethanol in the absence of molecular oxygen*

Palladous chloride (18 g.), acetaldehyde (39 g.) and ethanol (40 g.) were refluxed together for 72 hours. At the end of the reaction the mixture was treated in a similar way to that described in Example 8. Metallic palladium (2.3 g.) ethylacetate (1.76 g.) and diethyl acetal (48 g.) were obtained. Water was also formed in the reaction.

We claim:

1. A process for converting an aldehyde selected from the group consisting of saturated aliphatic and aromatic aldehydes to an ester of the carboxylic acid corresponding to the said aldehyde which comprises contacting the aldehyde in the liquid phase with a saturated unsubstituted aliphatic alcohol containing up to ten carbon atoms in the presence of a palladium salt and an inorganic redox system at a pressure in the range from atmospheric to 50 atmospheres, inclusive, said redox system being regenerated by means of molecular oxygen.

2. A process as claimed in claim 1 in which the aldehyde is acetaldehyde.

3. A process as claimed in claim 1 in which the alcohol is selected from the group consisting of methanol, ethanol, n-propanol, isopropanol, n-butanol, sec.-butanol and tert.-butanol.

4. A process as claimed in claim 1 in which the temperature employed lies in the range of 0° C. to 200° C.

5. A process as claimed in claim 1 in which the redox system is selected from the group consisting of cupric chloride, cupric acetate and ferric chloride.

6. A process as claimed in claim 1 in which there is provided, in the reaction mixture, an alkali metal salt of an unsubstituted lower monocarboxylic acid.

7. A process as claimed in claim 1 in which the reaction is carried out in the presence of a chloride ion concentration in the range of 0.05 to 0.5 molar.

8. A process as claimed in claim 1 in which the water concentration does not exceed 10% by weight of reactants.

9. A process as claimed in claim 1 in which a beta-lower alkoxy saturated aliphatic aldehyde is formed in situ by the introduction of an alpha-beta-unsaturated aldehyde into the ester-synthesis zone.

10. A process for converting a methoxy-aldehyde selected from the group consisting of beta-methoxy-propionaldehyde and beta-methoxy-isobutyr-aldehyde to the methyl ester of the carboxylic acid corresponding to said aldehyde, which comprises contacting said methoxy-aldehyde in the liquid phase with methanol, in the presence of palladous chloride, lithium chloride, lithium acetate and a redox system selected from the group consisting of cupric chloride and cupric acetate, at a pressure in the range from atmospheric to 50 atmospheres inclusive, the water concentration not exceeding 5% by weight, the total chloride ion concentration being in the range of 0.05 to 0.5 molar and the lithium acetate concentration being up to two molar, said redox system being regenerated by means of molecular oxygen and said methoxy-aldehyde being formed in situ by introducing an alpha-beta unsaturated aldehyde corresponding to the methoxy-aldehyde into the reaction medium.

References Cited by the Examiner

UNITED STATES PATENTS

| | | | |
|---|---|---|---|
| 2,198,946 | 4/1940 | Moskovits | 260—494 X |
| 3,079,429 | 2/1963 | Chafetz | 260—494 |
| 3,106,579 | 10/1963 | Hornig | 260—530 X |

FOREIGN PATENTS

| | | |
|---|---|---|
| 625,438 | 8/1961 | Canada. |
| 137,511 | 4/1960 | Russia. |

OTHER REFERENCES

Moiseev, Doklady Akademii Nauk SSSR, vol. 133, pp. 377–380 (1960).

LORRAINE A. WEINBERGER, *Primary Examiner.*

LEON ZITVER, *Examiner.*

D. P. CLARKE, V. GARNER, *Assistant Examiners.*